US005646693A

United States Patent [19]
Cismas

[11] Patent Number: 5,646,693
[45] Date of Patent: Jul. 8, 1997

[54] MEMORY UTILIZATION FOR VIDEO DECODING AND DISPLAY WITH 3:2 PULL-DOWN

[76] Inventor: Sorin Cismas, 1644 Belleville Way, Sunnyvale, Calif. 94087

[21] Appl. No.: 334,646

[22] Filed: Nov. 4, 1994

[51] Int. Cl.$^6$ .............................. H04N 7/01; H04N 11/02; H04N 9/64
[52] U.S. Cl. ........................... 348/44; 348/402; 348/409; 348/416; 348/714
[58] Field of Search .................... 348/714–716, 348/718–720, 441, 400–402, 409, 415, 416, 426, 567; H04N 7/00, 7/26, 7/01, 11/02, 9/64

[56] References Cited

U.S. PATENT DOCUMENTS

| Re. 31,460 | 12/1983 | Dalton et al. | 348/458 |
|---|---|---|---|
| 4,435,792 | 3/1984 | Becktolsheim | 348/714 |
| 5,343,248 | 8/1994 | Fujinami | 348/452 |
| 5,363,138 | 11/1994 | Hayashi et al. | 348/718 |
| 5,386,233 | 1/1995 | Keith | 348/719 |

FOREIGN PATENT DOCUMENTS

| 6051282 | 2/1994 | Japan | 348/567 |
|---|---|---|---|

OTHER PUBLICATIONS

ISO/IEC JTC1/SC29/WG11, Coding Of Moving Pictures And Associated Audio (May 10, 1994).

*Primary Examiner*—John K. Peng
*Assistant Examiner*—John W. Miller
*Attorney, Agent, or Firm*—Fish & Richardson, P.C.

[57] ABSTRACT

A system and method for decoding a video bitstream and displaying the video with 3:2 pull-down using a frame buffer whose size is not sufficient to hold an entire decoded frame. This is accomplished by using the additional time required by the display with 3:2 pull-down to decode a portion of the frame for a second time. The present invention provides memory savings, additional flexibility in decoder design, and reductions in memory controller complexity and power consumption. In the case of MPEG-2 decoders, the present invention allows the implementation of PAL/SECAM main profile at main level decoders with 3:2 pull-down using only a 16 megabit memory.

24 Claims, 8 Drawing Sheets

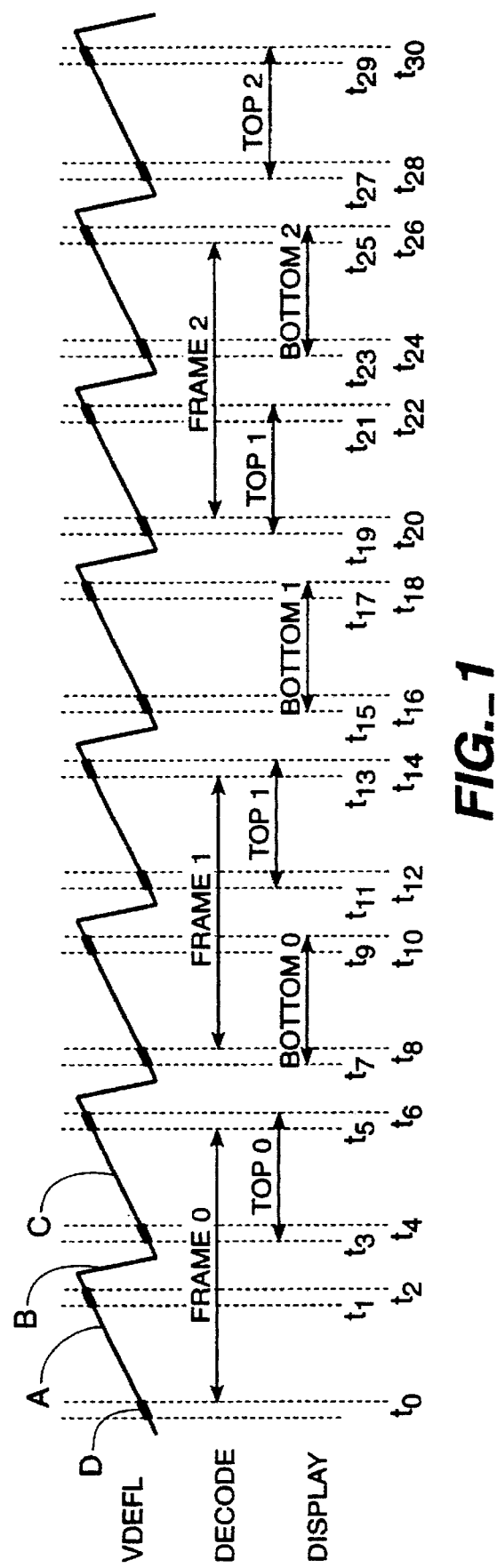
FIG._1

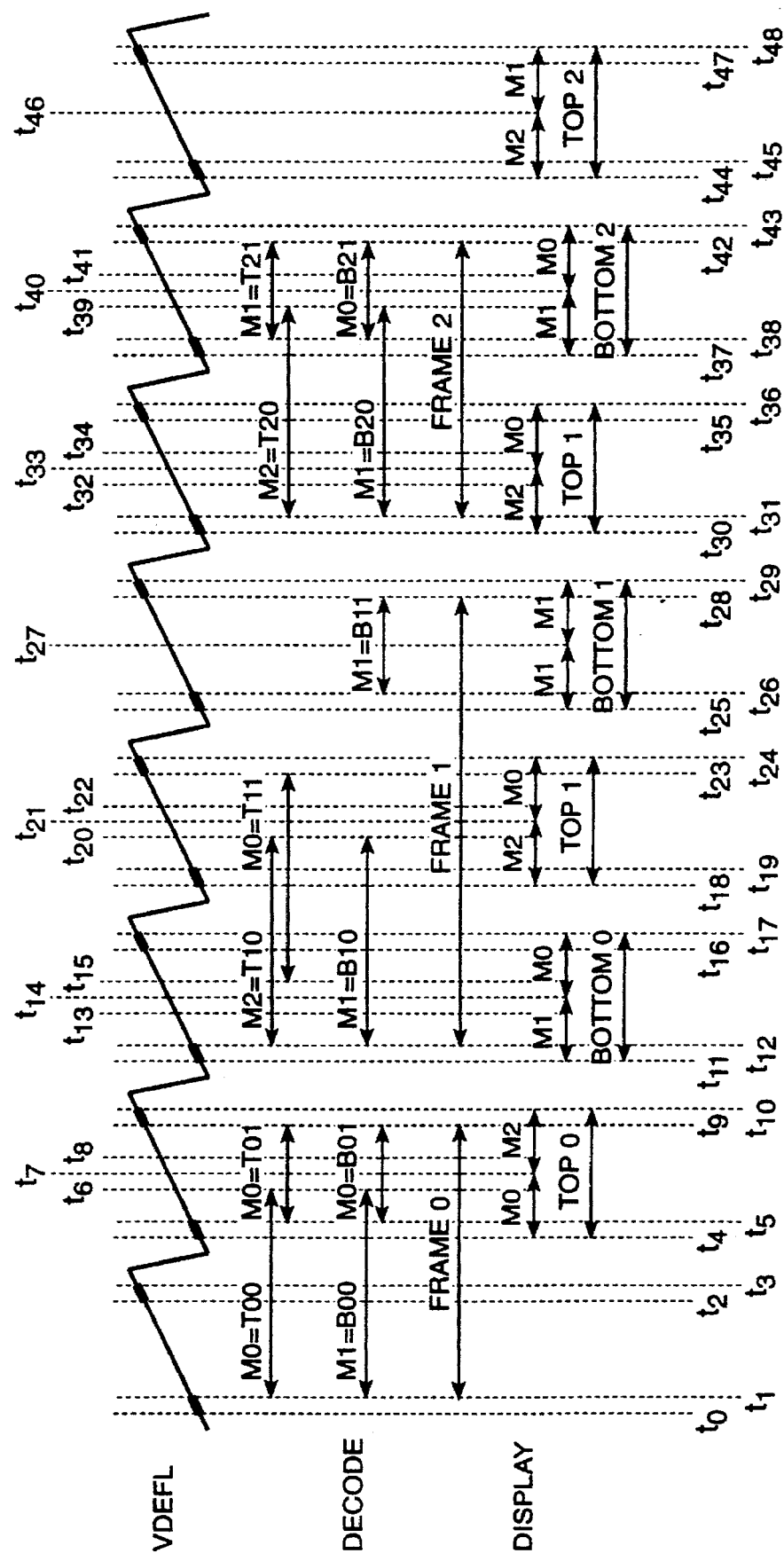
FIG._2

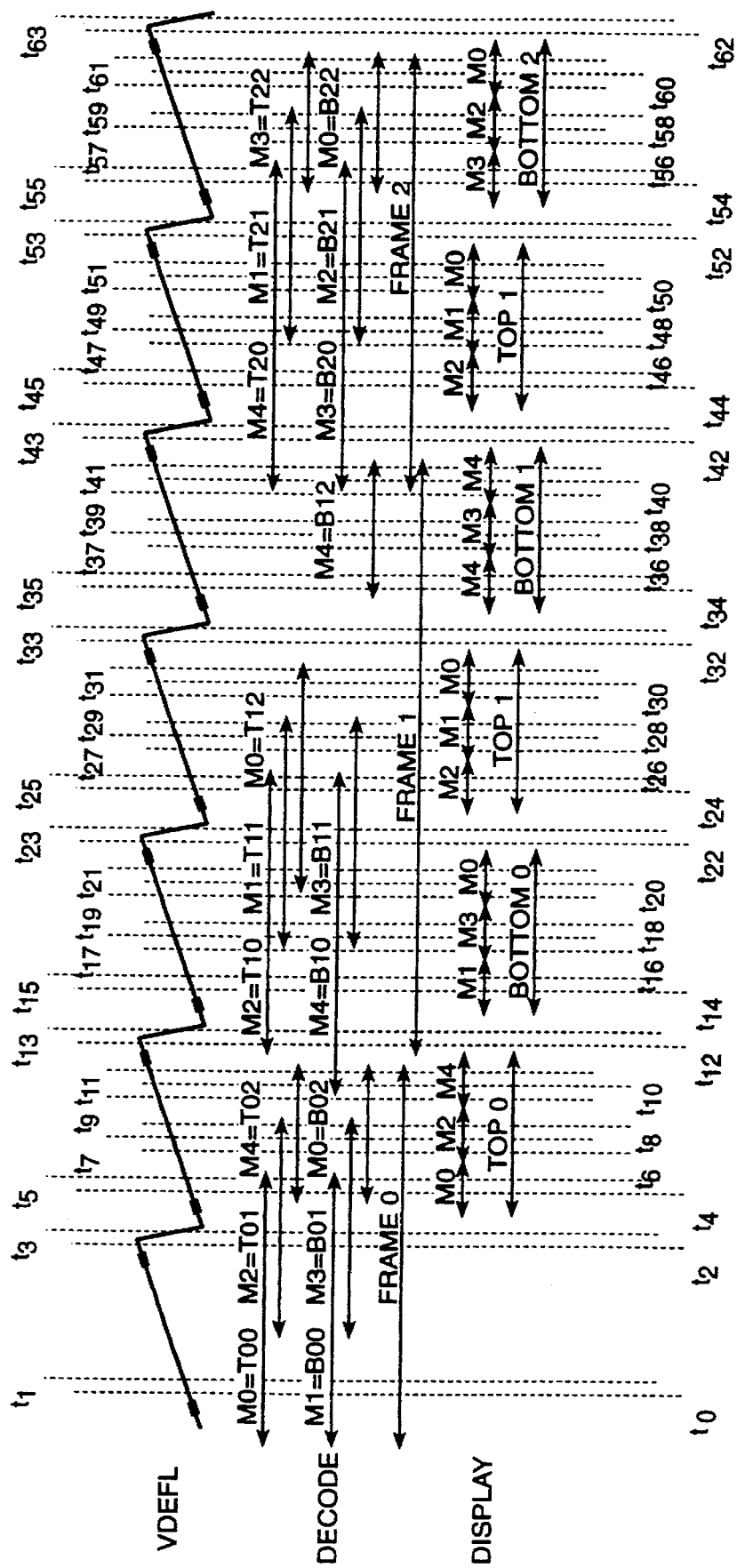
FIG._3

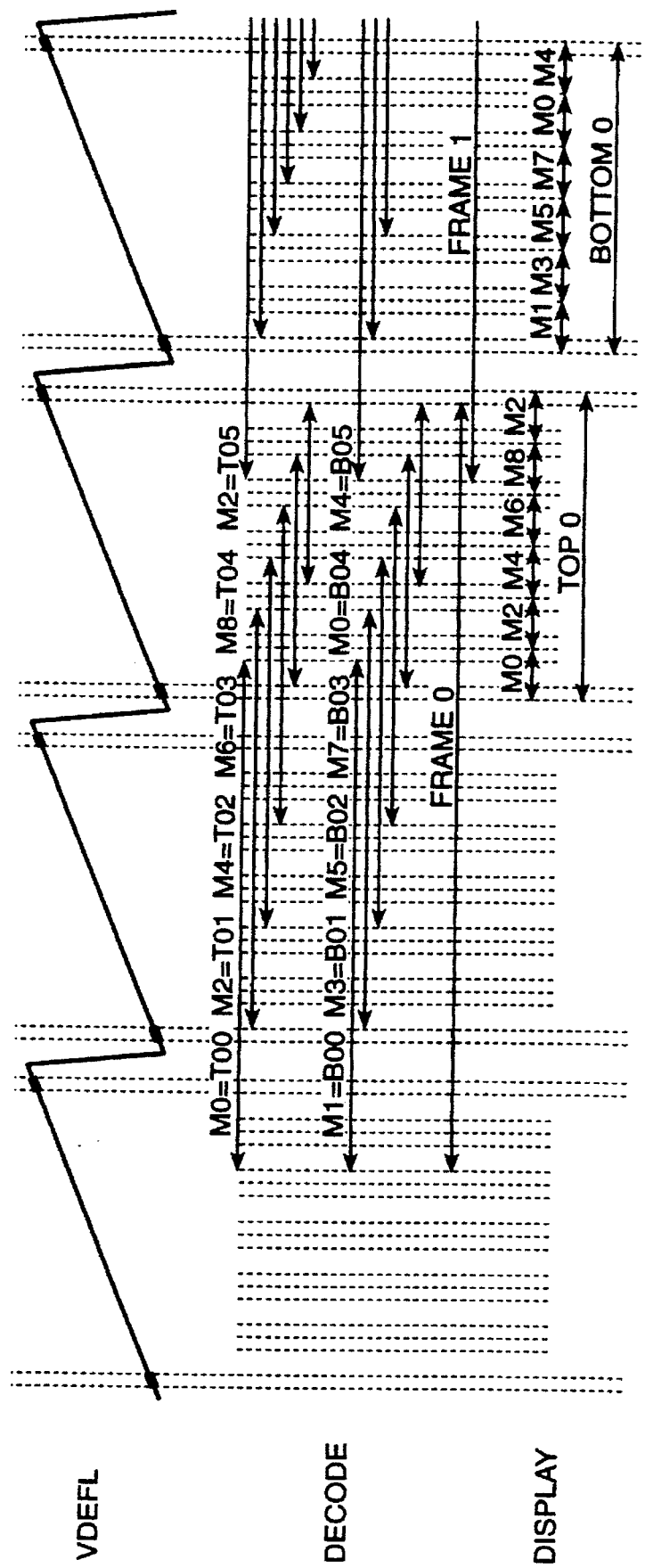
FIG._4A

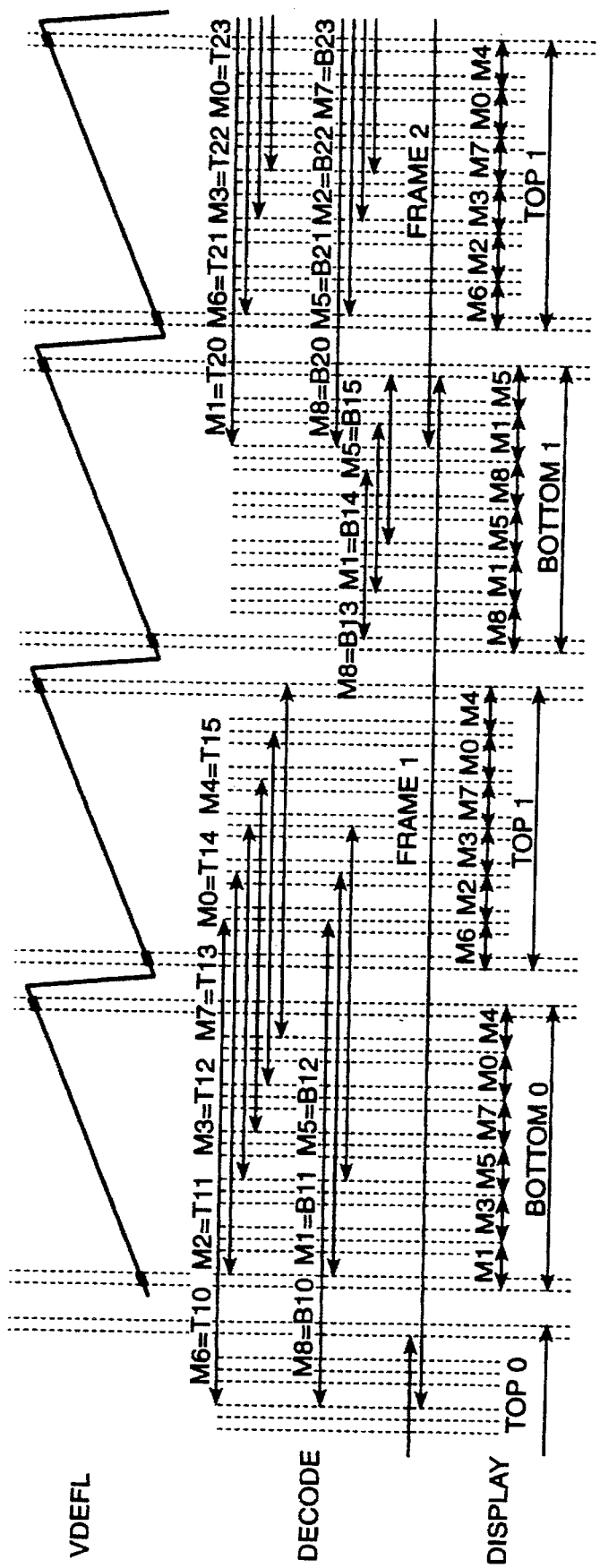
FIG._4B

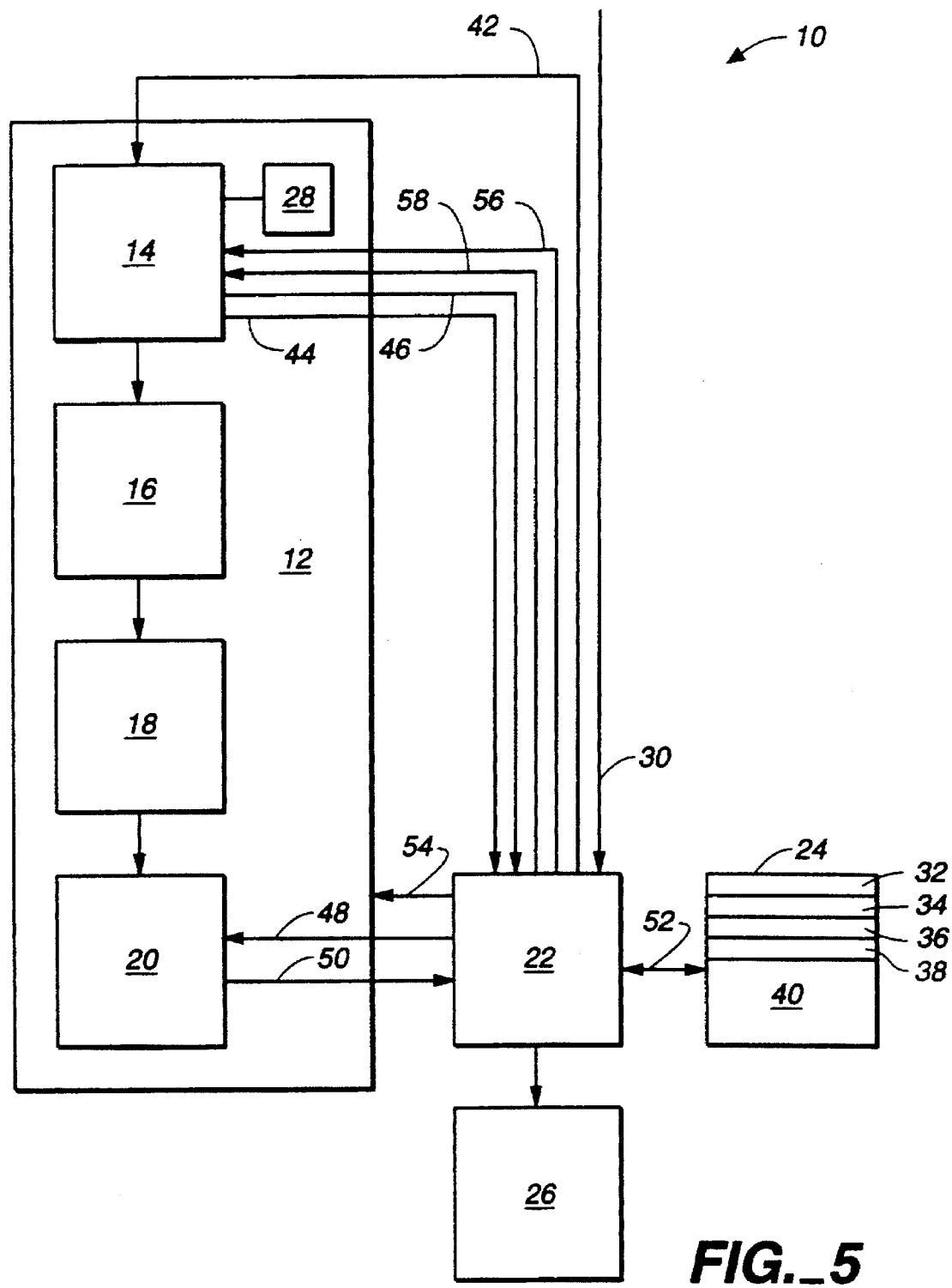
FIG._5

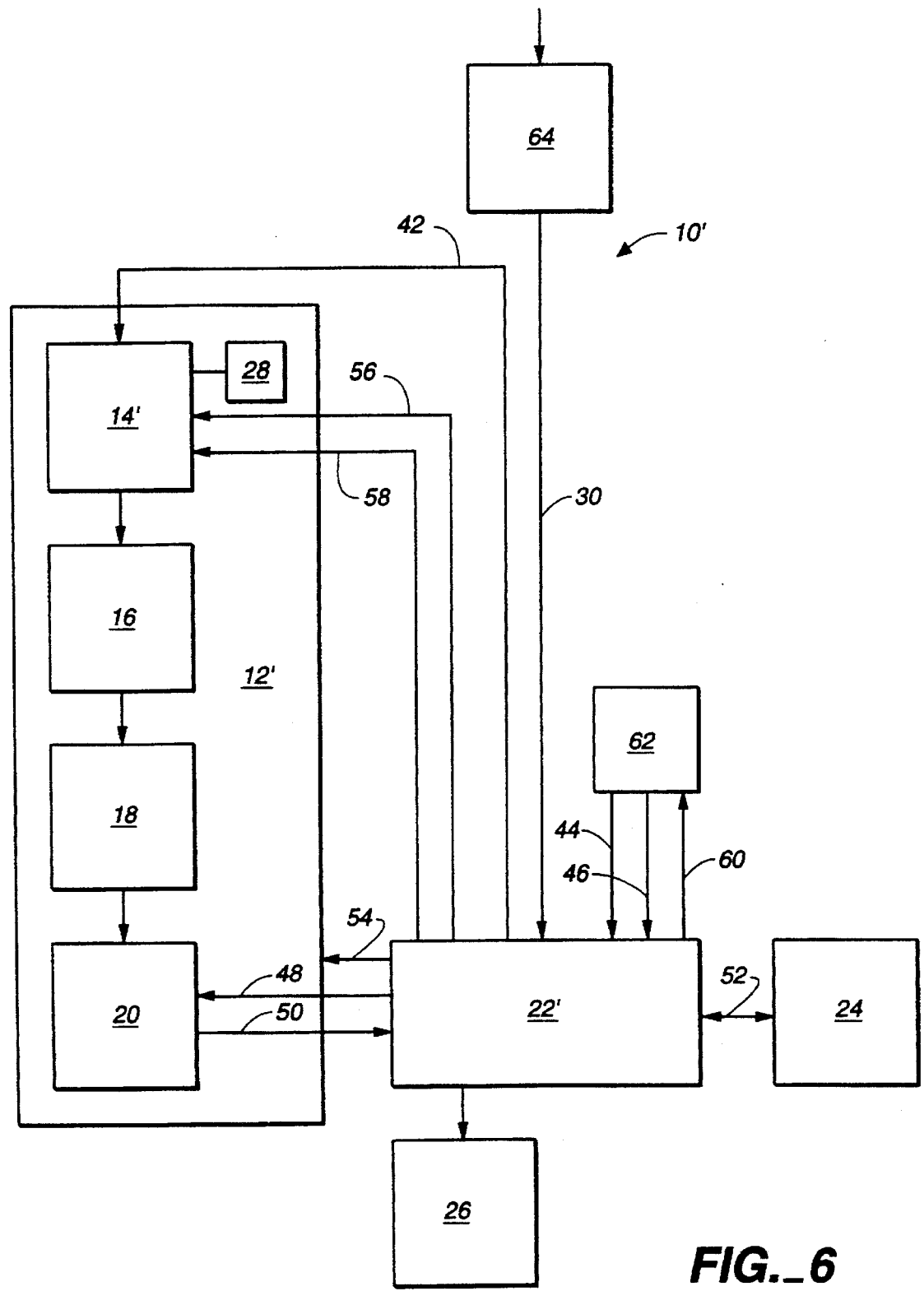
FIG._6

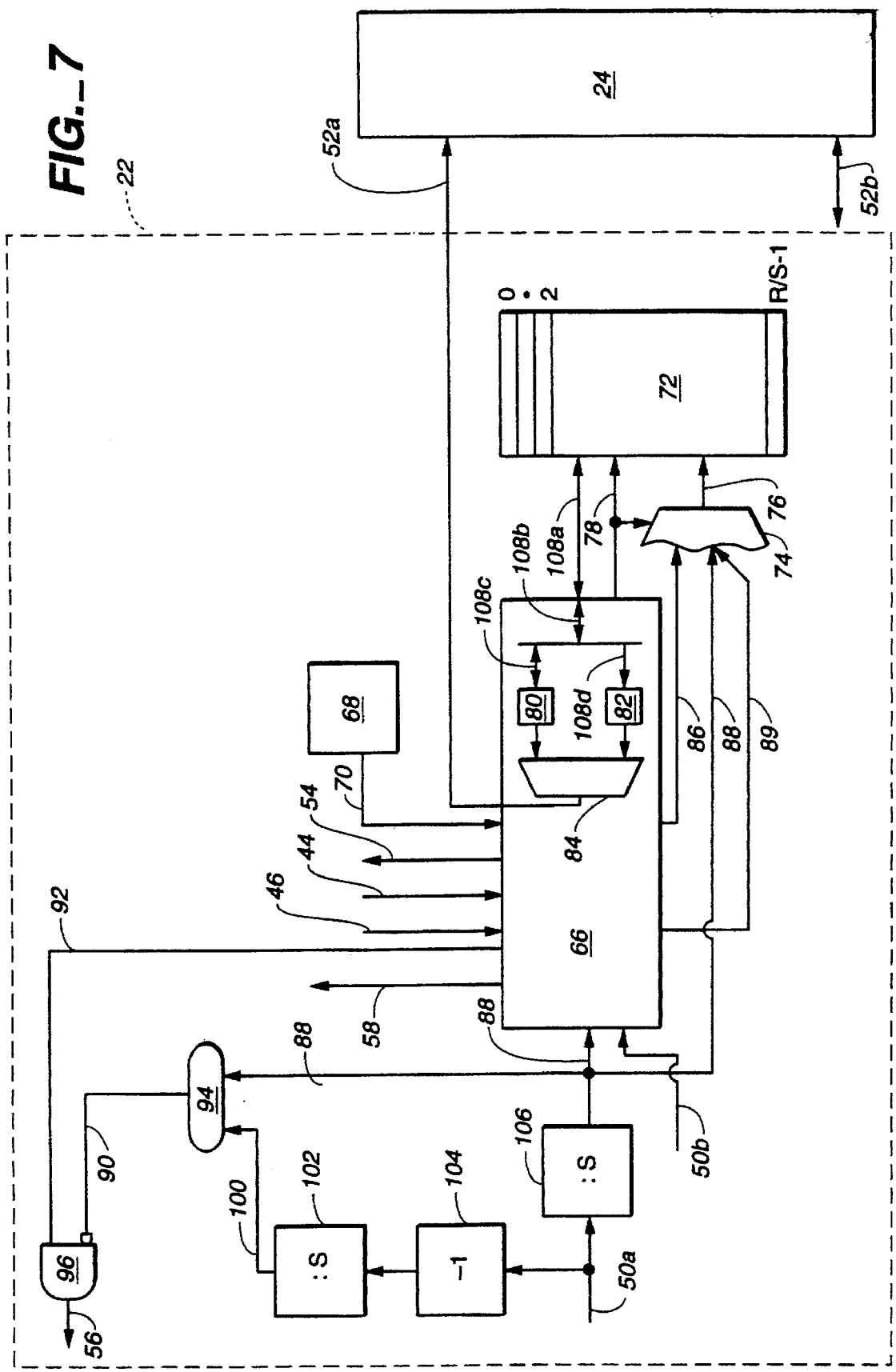

MEMORY UTILIZATION FOR VIDEO DECODING AND DISPLAY WITH 3:2 PULL-DOWN

BACKGROUND OF THE INVENTION

The present invention relates generally to image decompression using 3:2 pull-down, and more particularly to decoding and display of B-pictures using 3:2 pull-down.

Multimedia applications of digital processing, storage, and communication systems have been advancing at a rapid pace, as can be seen from the evolution of the standards for representing compressed video.

The MPEG-1 (Moving Picture Expert Group—1) International Standard (ISO/IEC 11172), approved November 1992, was developed mainly for continuous transfer rates of about 1.5 Mbit/s (megabit/second), although it has a large degree of flexibility. As such, it offers good results at spatial resolutions of about 350 pels (picture elements—samples of image data) horizontally by about 250 pels vertically when the picture rate is about 24 to 30 progressive (non-interlaced) pictures per second (pictures/s).

The MPEG-2 Draft International Standard (ISO/IEC 13818-2), adopted March 1994, provides for enhanced capabilities, and its main profile at main level (MP@ML) syntax subset with constrained parameters is specified for digital TV at International Radio Consultative Committee (CCIR) 601 resolution: interlaced at 720×480 @ 30 frames/s for NTSC (National Television System Committee) and 720×576 @ 25 frames/s for PAL/SECAM (phase alternation line / sequential color with memory). More details of the digital television parameters can be found in CCIR Recommendation 601-2, "Encoding Parameters of Digital Television for Studios" (1982, 1986, 1990).

Images displayed on a TV screen are a sequence of frames. Each frame is divided in two fields: the top field consists of all odd lines and the bottom field consists of all even lines. The two fields are displayed interlaced at intervals equal to one-half of a frame period. For NTSC the frame period is approximately 30 Hz and for PAL/SECAM it is 25 Hz.

A source material, such as a movie, that is progressive with 30 pictures/s may be converted to NTSC by separating each picture (frame) in the two fields that are displayed interlaced.

Many movies are progressive with 24 pictures/s. Such movies are converted to NTSC using 3:2 pull-down as follows. Each picture (frame) is separated into the two fields. Half of the pictures are displayed for two fields and the other half (every other picture) are displayed for three fields, with top and bottom fields always alternating. For example, if a movie consists of pictures P0, P1, P2 and P3, each picture would be separated in the top and bottom fields: T0, B0, T1, B1, T2, B2, T3 and B3. Pictures P0 and P2 would be displayed for two fields, and pictures P1 and P3 would be displayed for three fields, as follows: T0, B0, T1, B1, T1, B2, T2, B3, T3, B3. Note that the bottom field was displayed before the top field in picture P2. Repeating this procedure, every second 24 pictures are displayed: 12 pictures are displayed for two fields and 12 for three fields - a total of 60 fields per second (fields/s), which is the NTSC field rate.

Using a generalized pull-down, for which any picture can be displayed for two or three fields, the ratio between the display frame rate and the picture rate can be any number between 1 and 1.5. Using this generalized pull-down, progressive movies with 20–30 pictures/s can be displayed using NTSC and progressive movies with 16.67–25 pictures/s can be displayed using PAL/SECAM.

This pull-down feature is also used in MPEG decoders. MPEG-1 sequences and progressive sequences in MPEG-2 use it to display on NTSC and PAL/SECAM displays movies that have been progressive encoded (converted into a bitstream). The MPEG standards define a bitstream syntax and specify how a compliant decoder should process this bitstream to extract the audio and video information. The display of video data is beyond the scope of the MPEG standards, but any practical MPEG application that displays on a television set or on an interlaced monitor needs a display unit that implements the pull-down feature.

The MPEG-1 bitstream represents progressively scanned images and does not specify interlace or 3:2 pull-down. The pull-down feature must be carried out autonomously by the decoder and display unit. The MPEG-2 bitstream may represent both progressive and interlaced sequences. The progressive frames include two flags, top_field_first and repeat_first_field, to direct the way in which 3:2 pull-down is carried out.

Both MPEG-1 and MPEG-2 divide each picture into 16×16 square blocks of pels, called macroblocks, which are encoded one-by-one using a combination of frequency transformation, quantization and entropy coding. Motion compensation and predictive coding are also frequently used to achieve the high compression necessary. Motion compensation may be done using both a past picture and a future picture encoded before its appropriate position in the display sequence. Thus the decoder must be able to store two full pictures. The pictures whose decoding requires bidirectional prediction (i.e. both forward and backward prediction) are called B-pictures. B-pictures are not used to predict other pictures.

In order to provide some immunity to data corruption, the macroblocks of each picture are grouped into slices, which are sequences of successive macroblocks. Each slice may be decoded independent of the information in the previous slices. MPEG-1 does not restrict the distribution of macroblocks into slices. MPEG-2 requires that a new slice begin at the beginning of each row of macroblocks of a picture.

The above-mentioned MPEG-2 Main Profile at Main Level subset, discussed above, was defined in such a way that a 16 megabit (Mbit) memory is sufficient to decode the bitstream. Until recently, the organization of the memory was seen as:

720×576×8×1.5=4860 Kbits for the forward prediction picture

720×576×8×1.5=4860 Kbits for the backward prediction picture

720×576×8×1.5=4860 Kbits for the frame being decoded and displayed

1792 Kbits for the video buffer

12 Kbits for the system buffer

4 Kbits for the audio buffer

All these numbers add up to exactly 16 Mbits. No margin was provided.

It has been realized that additional buffering of at least 124 Kbits is needed for the system transport buffers, for demultiplexing and for packet overhead. If the 3:2 pull-down feature is not supported, it has been known heretofore how to decode and display a B-picture without storing it completely in the memory, so the additional 124 Kbits of buffers can be accommodated. For NTSC there are only 480 lines in a frame, so there is available memory for the 124

Kbits while supporting 3:2 pull-down by completely storing B-pictures as they are decoded and displayed. The size of the memory constitutes a problem for PAL/SECAM if the 3:2 pull-down feature is supported. This important feature would be very costly to implement for PAL/SECAM while storing the entire B-picture as has been known heretofore. The cost is due to the fact that standard memories are available only in certain sizes, and increasing the memory beyond 16 Mbits would also add to the complexity and power consumption of the memory controller.

Accordingly, it is an object of the present invention to reduce the frame buffer required for decoding and displaying a picture using 3:2 pulldown below the size required to hold image information for one full frame.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the claims.

SUMMARY OF THE INVENTION

The present invention is directed to a system for decoding and display of a bitstream representing compressed video. The system includes a decoder, a memory manager connected to the decoder, a display subsystem connected to the memory manager, and a memory connected to the memory manager. The memory includes a frame buffer of a size less than a size sufficient to store decoded image information for an entire frame. The memory manager is responsive to a top field first signal and to a repeat first field signal.

The method of the present invention includes decoding a frame to be displayed using 3:2 pull-down and writing part of the decoded image information of the frame to a frame buffer. The size of the frame buffer is not sufficient to store decoded image information of the entire frame. A first portion of decoded image information is written to a first set of memory locations of the frame buffer. After decoding the entire frame, a portion of the frame is decoded for a second time. A second portion of decoded image information is written to memory locations from the first set which contain image information that has been displayed at least once.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

FIG. 1 is a timing diagram illustrating a common method for decoding and displaying a bitstream using 3:2 pull-down.

FIGS. 2, 3, 4A and 4B are timing diagrams illustrating methods for decoding and displaying a bitstream according to the present invention.

FIG. 5 is a schematic block diagram of a decoding and displaying system according to the present invention.

FIG. 6 is a schematic block diagram of an alternate embodiment of a decoding and displaying system according to the present invention.

FIG. 7 is a schematic block diagram illustrating details of the memory controller 22 of FIG. 5.

DESCRIPTION OF THE PREFERRED EMBODIMENT

The present invention will be described in terms of several preferred embodiments. The preferred embodiments are an apparatus and method for decoding pictures using 3:2 pull-down. The method for such decoding known heretofore is described with reference to FIG. 1. As will be seen, this method requires use of a frame buffer of a size sufficient to hold image information for one full frame.

For a sequence of B-pictures, the same memory is used for both decoding and display. The pictures used for prediction cannot be overwritten because they might be needed to predict future pictures. In FIG. 1, vdefl is the display's vertical deflection signal. The rising lines A show the progression of the display (usually from top to bottom) and the falling lines B are the vertical retrace periods. The thick lines C show the active portion of the display and the very thick segments D indicate the first and last rows of macroblocks (8 display lines in each field because the pictures are frame encoded and field displayed).

FIG. 1 shows a sequence of three B-pictures. Frame 1 is displayed for three fields—the top field is repeated. Because the same memory is used for both decode and display, some restrictions apply in order to avoid overwriting a field before it is displayed or displaying a field before it is decoded:

Frame 0 must be decoded before the last row of macroblocks of the top field 0 (Top 0) is displayed. The last row of macroblocks of the top field 0 is displayed between times $t_5$ and $t_6$. Thus frame 0 is decoded before $t_5$.

Frame 1 must be decoded only after the first row of macroblocks of the bottom field 0 (Bottom 0) has been displayed. The first row of macroblocks of the bottom field 0 is displayed between times $t_7$ and $t_8$. Thus frame 1 is decoded after $t_8$.

Frame 1 must be decoded before the last row of macroblocks of the top field 1 (Top 1) is displayed. The last row of macroblocks of the top field 1 is displayed between times $t_{13}$ and $t_{14}$. Thus frame 1 is decoded before $t_{13}$.

Frame 2 must be decoded only after the first row of macroblocks of the top field 1 has been displayed for the second time. The first row of macroblocks of the top field 1 is displayed for the second time between times $t_{19}$ and $t_{20}$. Thus frame 1 is decoded after $t_{20}$.

Frame 2 must be decoded before the last row of macroblocks of the bottom field 2 (Bottom 2) is displayed. The last row of macroblocks of the bottom field 2 is displayed between times $t_{25}$ and $t_{26}$. Thus frame 2 is decoded before $t_{25}$.

Because of these restrictions, the decoder must be able to decode any frame in the display period of two fields (480 lines for NTSC and 576 lines for PAL/SECAM), plus one vertical retrace period (22.5 lines for NTSC and 24.5 lines for PAL/SECAM), minus the time needed to display 16 lines. For NTSC, the decoder must be able to decode any frame in (480 lines+22.5 lines−16 lines) / 525 lines=92.67%, and for PAL/SECAM in (576 lines+24.5 lines−16 lines) / 625 lines=93.52% of the frame period.

As can be seen in FIG. 1 between, e.g. $t_5$ and $t_8$, the decoder is stopped during the vertical blinking period occurring between fields of the same frame and while the top field 1 (Top 1) is repeated. The present invention saves memory by using some of these periods to decode some of the rows of macroblocks twice. To the extent to which otherwise idle periods are used for this additional decoding, the present invention does not require increased processing power or higher memory bandwidth. The only price to pay is a small increase in the memory controller complexity. The same method can be used to reduce the memory requirement for NTSC. The saved memory could be used to provide additional functionality such as off-screen memory or graphics overlay.

If the picture has R rows of macroblocks and r rows of macroblocks are to be saved, then 2r rows needs to be decoded twice. Without increasing the decoder speed significantly, up to R/2 rows of macroblocks can be decoded twice. Therefore, r is equal to or less than R/4, i.e. up to 25% of a frame memory can be saved. For PAL/SECAM (R=36) up to 9 rows of macroblocks can be saved, and for NTSC (R=30) up to 7 rows of macroblocks can be saved. Table 1 shows the memory saving possibilities for PAL/SECAM and Table 2 shows the memory saving possibilities for NTSC. The third column shows the memory allocation unit (MAU) size s in rows of macroblocks. MAU size s needs to be a divisor of r and R/s should be an even number. There is a trade-off between simplicity and flexibility. The bigger s is, the simpler the memory controller is, but the smaller s is, the greater the operation flexibility is.

TABLE 1

Memory saving possibilities for PAL/SECAM

| r saved rows of macroblocks | Rows of macroblocks decoded twice | s memory allocation unit size in rows of macroblocks | saved memory in Kbytes |
|---|---|---|---|
| 0 | 0 | 36 | 0 |
| 1 | 2 | 1 | 17.28 |
| 2 | 4 | 2, 1 | 34.56 |
| 3 | 6 | 3, 1 | 51.84 |
| 4 | 8 | 2, 1 | 69.12 |
| 5 | 10 | 1 | 86.40 |
| 6 | 12 | 6, 3, 2, 1 | 103.68 |
| 7 | 14 | 1 | 120.96 |
| 8 | 16 | 2, 1 | 138.24 |
| 9 | 18 | 9, 3, 1 | 155.52 |

TABLE 2

Memory saving possibilities for NTSC

| r saved rows of macroblocks | Rows of macroblocks decoded twice | s memory allocation unit size in rows of macroblocks | saved memory in Kbytes |
|---|---|---|---|
| 0 | 0 | 30 | 0 |
| 1 | 2 | 1 | 17.28 |
| 2 | 4 | 1 | 34.56 |
| 3 | 6 | 3, 1 | 51.84 |
| 4 | 8 | 1 | 69.12 |
| 5 | 10 | 5, 1 | 86.40 |
| 6 | 12 | 3, 1 | 103.68 |
| 7 | 14 | 1 | 120.96 |

A general algorithm that works for arbitrary R, r and s subject to the conditions above is discussed below.

Decoding a B-picture without 3:2 pull-down preferably may begin at least a field period before the first field of the frame is to be displayed. The two fields are decoded concurrently. Sections of the two fields that are displayed on the same portion of the screen will be called corresponding sections. Such sections are written concurrently to those memory allocation units that are the least recently displayed (at least the first row of macroblocks) and with the already displayed image information not to be redisplayed in the future, as such MAU become available. During the decoding of the second half of the frame, some or all MAU used to hold image information for the first half of the first field to be displayed will be reused.

Decoding a B-picture using 3:2 pull-down preferably may begin at least a field period before the first field of the frame is to be displayed. The two fields are decoded concurrently.

For the first (R-2r)/R of the frame, corresponding sections of the two fields are written concurrently to those memory allocation units that are the least recently displayed (at least the first row of macroblocks) and with the already displayed image information not to be redisplayed again in the future, as such MAU become available.

After decoding the first (R-2r)/R of the frame, the rest of the frame is decoded but only image information for the first field to be displayed is written. The image information for the corresponding sections of the second field is discarded. The image information for the first field is written to those memory allocation units that are the least recently displayed (at least the first row of macroblocks) and with the already displayed image information not to be redisplayed in the future, as such MAU become available. Then, the last 2r/R of the frame is decoded again but only image information for the second field to be displayed is written. The image information for the corresponding sections of the first field is discarded. The image information for the second field is written to those memory allocation units that are the least recently displayed (at least the first row of macroblocks) and with the already displayed image information not to be redisplayed in the future, as such MAU become available. These MAU will be the initial MAU used to hold image information for the first half of the second field to be displayed.

The above method ensures that the image to be displayed is decoded in time (the decoding is finished before the last row of macroblocks begins to be displayed) without a significant increase in processing power or memory bandwidth.

It is possible to implement the above general algorithm without comparing display times of any two MAU. To do so, it is necessary to maintain information on what MAU was used to hold any section of a field in the frame currently decoded and any section, corresponding to a section in the frame currently decoded that has not yet been decoded, in the immediately previous frame to be decoded.

To write the above algorithm for memory allocation for decode and display, a few notations are needed:

R=picture height in rows of macroblocks r=saved memory in rows of macroblocks s=MAU size in rows of macroblocks n=frame number (current decoded frame)

(n-1)=previous decoded frame

F=field—can be T (top) or B (bottom) !F=opposite field (!T==B and !B==T)

Fn=field "F" of frame "n"

i=section number of a field; i<=R/(2s)

Fni=field "F" of frame "n" section "i"

M=memory allocation unit; M<=(R-r)/s

M(Fni)="M" where "Fni"is stored

D0, D1 =temporary variables top_field_first=flag from the MPEG-2 video bitstream or internally generated repeat_first_field=flag from the MPEG-2 video bitstream or internally generated The general rule to be applied when decoding any B frame written in C-like pseudocode is:

```
while (new B frame to be decoded) {
        if (top_field_first)                F = T;
        else                                 F = B;
        for (i = 0; i < (R–2*r)/(2*s); i++) {
            if (r/s+2*i < R/(2*s))
                D0 = M(F(n–1) (r/s+2*i));
            else
                D0 = M(!F(n–1)(r/s+2*i–R/(2*s)));
            if (r/s+2*i+1 < R/(2*s))
                D1 = M(F(n–1) (r/s+2*i+1));
            else
                D1 = M(!F(n–1)(r/s+2*i+1–R/(2*s)));
            decode Fni and !Fni and store Fni to D0
                and !Fni to D1;
            M(Fni) = D0; M(!Fni) = D1;
        }
        if (repeat_first_field) {
            for (i = (R–2*r)/(2*s); i < R/(2*s) ; i++) {
                D0 = M(!F(n–1)i) ;
                decode Fni (and !Fni) and store Fni to D0 ;
                M(!Fni) = D0 ;
            }
            for ( i = (R–2*r)/(2*s); i < R/(2*s) ; i++) {
                D1 = M(!Fn(i–(R–2*r)/(2*s));
                decode !Fni (and Fni) and store !Fni to D1 ;
                M(!Fni) = D1 ;
            }
        }else{
            for ( i = (R–2*r)/(2*s); i < R/(2*s) ; i++) {
                if (r/s+2*i < R/s)
                    D0 = M(!F(n–1)(r/s+2*i–R/(2*s)));
                else
                    D0 = M(Fn(r/s+2*i–R/s));
                if (r/s+2*i+1 < R/s)
                    D1 = M(!F(n–1)(r/s+2*i+1–R/(2*s)));
                else
                    D1 = M(Fn(r/s+2*i+1–R/s));
                decode Fni and !Fni and store Fni to D0
                    and !Fni to D1;
                M(Fni) = D0; M(!Fni) = D1;
            }
        }
}
```

A particular solution for R=36, r=9 and s=9 is described with reference to FIG. 2 and Table 3. The memory used to decode and display the B-frames with 3:2 pull-down is logically divided into three memory allocation units—M0, M1 and M2, each of nine rows of macroblocks.

FIG. 2 shows a sequence of three B-pictures. Frame 1 is displayed for three fields—the top field is repeated.

The first field of Frame 0 is displayed between $t_4$ and $t_{10}$. The decoding of Frame 0 begins at time $t_1$, eight display lines duration after the prior field begins to be displayed at $t_0$. At time $t_1$ only one MAU, which holds the second half of the field being displayed, is unavailable. Thus there are two MAUs available, M0 and M1. The first section of the top field, T00, is written to M0, and the first section of the bottom field, B00, is written to M1. Of these MAUs, the first one to be displayed is M0, from $t_4$ until $t_7$. The decoding of the first section of Frame 0 must thus be finished at the latest at $t_6$, eight display lines before $t_7$.

Since this frame is not displayed using 3:2 pull-down, the decoder waits until two MAUs become available before decoding the second section of the frame. M2 becomes available between $t_1$ and $t_2$ and the next MAU to become available is M0 at $t_5$, eight display lines after it begins to be displayed at $t_4$. The second section of the top field, T01, is written to M2, and the second section of the bottom field, B01, is written to M0. Of these MAUs, the first one to be displayed is M2, from $t_7$ until $t_{10}$. The decoding of the second section of Frame 0 must thus be finished at the latest at $t_9$, eight display lines before $t_{10}$.

The next frame, Frame 1, is displayed using 3:2 pull-down. The first field of Frame 1 is displayed between $t_{18}$ and $t_{24}$. The decoder begins to decode it once two MAUs become available. M2 is displayed between $t_7$ and $t_{10}$, and thus becomes available at $t_5$, eight display lines after $t_7$. The next MAU to become available, M1, is displayed between $t_{11}$ and $t_{14}$, and thus becomes available at $t_{12}$, eight display lines after $t_{11}$. The decoding of Frame 1 thus begins at time $t_{12}$, eight display lines after the prior field bottom 0 begins to be displayed at $t_{11}$. The first section of the top field, T10, is written to M2, and the first section of the bottom field, B10, is written to M1. Of these MAUs, the first one to be displayed is M2, from $t_{18}$ until $t_{21}$. The decoding of the first section of Frame 1 must thus be finished at the latest at $t_{20}$, eight display lines before $t_{21}$.

At this point, the first (R–2r)/R (i.e. ½) of the frame has been decoded. As previously discussed, the rest of the frame is decoded, but only image information for the first field to be displayed is written as MAUs become available. The next MAU to become available is M0 at $t_{15}$, eight display lines after it begins to be displayed at $t_{14}$. The second section of the frame is decoded and the second section of the top field, $T_{11}$, is written to M0. This second section is displayed between $t_{21}$ and $t_{24}$, so that the decoding must end at $t_{23}$, eight display lines before $t_{24}$.

At this point, the entire Frame 1 has been decoded once. Next, as discussed earlier, the last 2r/R (i.e. ½) of the frame is decoded again but only image information for the second field to be displayed is written as MAUs become available. M2 and M0 must be saved for the repeat of the top field. Thus the first MAU to become available is M1, at $t_{26}$, eight display lines after it begins to be displayed at $t_{25}$. The second section of the frame is decoded again and the second section of the bottom field, B11, is written to M1. This second section is displayed between $t_{27}$ and $t_{29}$, so that the decoding must end at $t_{28}$, eight display lines before $t_{29}$.

The next frame to be displayed, Frame 2, begins to be decoded as soon as two MAUs become available. M1 becomes available between $t_{27}$ and $t_{28}$. The next MAU to become available is M2 at $t_{31}$, eight display lines after it begins to be displayed between $t_{30}$ and $t_{33}$. The first section of the top field, T20, is written to M2, and the first section of the bottom field, B20, is written to M1. Of these MAUs, the first one to be displayed is M1, from $t_{37}$ until $t_{40}$. The decoding of the first section of Frame 2 must thus be finished at the latest at $t_{39}$, eight display lines before $t_{40}$.

Since this frame is not displayed using 3:2 pull-down, the decoder waits until two MAUs become available before decoding the second section of the frame. M0 becomes available at $t_{34}$, eight display lines after it begins to be displayed between $t_{33}$ and $t_{36}$, and the next MAU to become available is M1 at $t_{38}$, eight display lines after it begins to be displayed at $t_{37}$. The second section of the top field, T21, is written to M1, and the second section of the bottom field, B21, is written to M0. Of these MAUs, the first one to be displayed is M0, from $t_{40}$ until $t_{43}$. The decoding of the second section of frame 2 must thus be finished at the latest at $t_{42}$, eight display lines before $t_{43}$.

Sometimes the same MAU is used for both decode and display, and therefore restrictions apply to avoid overwriting MAU data before it is displayed or displaying MAU data before it is decoded. Because of these restrictions, the decoder needs to decode half a frame in the display period of one field, minus the time needed to display 16 lines (see FIG. 2, the decoding of B11 between $t_{26}$ and $t_{28}$). There are some fields that could be decoded in more than that, but the decoder needs the computation bandwidth for the other fields. For NTSC, the decoder needs to decode any frame in 2×(240 lines–16 lines) / 525 lines=85.33% of the frame period, and for PAL/SECAM in 2×(288 lines−16 lines) / 625 lines=87.04% of the frame period. This solution (r=9; s=9) needs a slightly faster decoder compared to the previously known solution, because none of the vertical retrace periods can be used for some of the decoding.

Table 3 shows MAU allocation for five frames with the following combinations of repeat_first_field and top_field_first:

repeat_first_field=0, top_field_first=1.
repeat_first_field=0, top_field_first=1.
repeat_first_field=1, top_field_first=1.
repeat_first_field=1, top_field_first=0.
repeat_first_field=0, top_field_first=1.

Such a frame sequence will be called a 22332 frame sequence, based on the number of field periods during which each frame is displayed. This is the shortest frame sequence that contains all possible combinations of consecutive frames with or without the 3:2 pull-down:

2 fields followed by 2 fields
2 fields followed by 3 fields
3 fields followed by 3 fields
3 fields followed by 2 fields

TABLE 3

| | Memory organization and decode/display schedule for R = 36, r = 9, s = 9 | | | |
|---|---|---|---|---|
| Decode frame | Decode top field | Decode bottom field | Display top field | Display bottom field |
| Frame 0 | M0 = T00 | M1 = B00 | | |
| Frame 0 | M0 = T00 | M1 = B00 | | |
| Frame 0 | M2 = T01 | M0 = B01 | T00 = M0 | |
| Frame 0 | M2 = T01 | M0 = B01 | T01 = M2 | |
| Frame 1 | M2 = T10 | M1 = B10 | | B00 = M1 |
| Frame 1 | M2 = T10 | M1 = B10 | | B01 = M0 |
| Frame 1 | M0 = T11 | M2 = B11 | T10 = M2 | |
| Frame 1 | M0 = T11 | M2 = B11 | T11 = M0 | |
| Frame 2 | M0 = T20 | M1 = B20 | | B10 = M1 |
| Frame 2 | M0 = T20 | M1 = B20 | | B11 = M2 |
| Frame 2 | M0 = T21 | | T20 = M0 | |
| Frame 2 | M2 = T21 | | T21 = M2 | |
| Frame 2 | | M1 = B21 | | B20 = M1 |
| Frame 2 | | M1 = B21 | | B21 = M1 |
| Frame 3 | M0 = T30 | M1 = B30 | T20 = M0 | |
| Frame 3 | M0 = T30 | M1 = B30 | T21 = M2 | |
| Frame 3 | | M2 = B31 | | B30 = M1 |
| Frame 3 | | M2 = B31 | | B31 = M2 |
| Frame 3 | M0 = T31 | | T30 = M0 | |
| Frame 3 | M0 = T31 | | T31 = M0 | |
| Frame 4 | M0 = T40 | M1 = B40 | | B30 = M1 |
| Frame 4 | M0 = T40 | M1 = B40 | | B31 = M2 |
| Frame 4 | M2 = T41 | M0 = B41 | T40 = M0 | |
| Frame 4 | M2 = T41 | M0 = B41 | T40 = M2 | |
| | | | | B40 = M1 |
| | | | | B41 = M0 |

A particular solution for R=36, r=6 and s=6 is described with reference to FIG. 3 and Table 4. The memory used to decode and display the B-frames with 3:2 pull-down is logically divided into five memory allocation units (MAU) —M0, M1, M2, M3, and M4, each of six rows of macroblocks.

FIG. 3 shows a sequence of three B-pictures. Frame 1 is displayed for three fields—the top field is repeated.

The first field of Frame 0 is displayed between $t_4$ and $t_{13}$. The decoding of Frame 0 begins before time $t_0$, when MAUs M0 and M1 become available. The first section of the top field, T00, is written to M0, and the first section of the bottom field, B00, is written to M1. Of these MAUs, the first one to be displayed is M0, from $t_4$ until $t_7$. The decoding of the first section of Frame 0 must thus be finished at the latest at $t_6$, eight display lines before $t_7$.

Since this frame is not displayed using 3:2 pull-down, the decoder waits until two MAUs become available before decoding the second section of the frame. The M2 and M3 pair becomes available between $t_1$ and $t_2$. The second section of the top field, T01, is written to M2, and the second section of the bottom field, B01, is written to M3. Of these MAUs, the first one to be displayed is M2, from $t_7$ until $t_{10}$. The decoding of the second section of Frame 0 must thus be finished at the latest at $t_9$, eight display lines before $t_{10}$.

Since this frame is not displayed using 3:2 pull-down, the decoder waits until two more MAUs become available before decoding the third section of the frame. M4 becomes available before $t_5$ and the next MAU to become available is M0 at $t_5$, eight display lines after it begins to be displayed at $t_4$. The third section of the top field, T02, is written to M4, and the third section of the bottom field, B02, is written to M0. Of these MAUs, the first one to be displayed is M4, from $t_{10}$ until $t_{13}$. The decoding of the third section of Frame 0 must thus be finished at the latest at $t_{12}$, eight display lines before $t_{13}$.

The next frame, Frame 1, is displayed using 3:2 pull-down. The first field of Frame 1 is displayed between $t_{24}$ and $t_{33}$. The decoder begins to decode it once two MAUs become available. M2 is displayed between $t_7$ and $t_{10}$, and thus becomes available at $t_8$, eight display lines after $t_7$. The next MAU to become available, M4, is displayed between $t_{10}$ and $t_{13}$, and thus becomes available at $t_{11}$, eight display lines after $t_{10}$. The first section of the top field, T10, is written to M2, and the first section of the bottom field, B10, is written to M4. Of these MAUs, the first one to be displayed is M2, from $t_{24}$ until $t_{27}$. The decoding of the first section of Frame 1 must thus be finished at the latest at $t_{26}$, eight display lines before $t_{27}$.

At this point, the first (R−2r)/R (i.e. ⅔) of the frame has not yet been completely decoded. The decoder waits until two more MAUs become available before decoding the second section of the frame. M1 becomes available at $t_{15}$, eight display lines after it begins to be displayed at $t_{14}$, and the next MAU to become available is M3 at $t_{18}$, eight display lines after it begins to be displayed at $t_{17}$. The second section of the top field, T11, is written to M1, and the second section of the bottom field, B11, is written to M3. Of these MAUs, the first one to be displayed is M1, from $t_{27}$ until $t_{30}$. The decoding of the second section of Frame 1 must thus be finished at the latest at $t_{29}$, eight display lines before $t_{30}$.

At this point, the first (R−2r)/R (i.e. ⅔) of the frame has been decoded. As previously discussed, the rest of the frame is decoded, but only image information for the first field to be displayed is written as MAUs become available. The next MAU to become available is M0 at $t_{21}$, eight display lines after it begins to be displayed at $t_{20}$. The third section of the frame is decoded and the third section of the top field, T12, is written to M0. This third section is displayed between $t_{30}$ and $t_{33}$, so that the decoding must end at $t_{32}$, eight display lines before $t_{33}$.

At this point, the entire Frame 1 has been decoded once. Next, as discussed earlier, the last 2r/R (i.e. ⅓) of the frame is decoded again but only image information for the second field to be displayed is written as MAUs become available. M2, M1 and M0 must be saved for the repeat of the top field. Thus the first MAU to become available is M4, at $t_{35}$, eight display lines after it begins to be displayed at $t_{34}$. The third section of the frame is decoded again and the third section of the bottom field, B12, is written to M4. This third section is displayed between $t_{40}$ and $t_{43}$, so that the decoding must end at $t_{42}$, eight display lines before $t_{43}$.

The next frame to be displayed, Frame 2, begins to be decoded as soon as two MAUs become available. M3 becomes available at $t_{38}$, eight display lines after it begins to be displayed between $t_{37}$ and $t_{40}$. The next MAU to become available is M4 at $t_{41}$, eight display lines after it begins to be displayed between $t_{40}$ and $t_{43}$. The first section of the top field, T20, is written to M4, and the first section of the bottom field, B20, is written to M3. Of these MAUs, the first one to be displayed is M3, from $t_{54}$ until $t_{57}$. The decoding of the first section of Frame 2 must thus be finished at the latest at $t_{56}$, eight display lines before $t_{57}$.

Since this frame is not displayed using 3:2 pull-down, the decoder waits until two MAUs become available before decoding the second section of the frame. M2 becomes available at t45, eight display lines after it begins to be displayed between t44 and t47, and the next MAU to become available is M1 at $t_{48}$, eight display lines after it begins to be displayed at $t_{47}$. The second section of the top field, T21, is written to M1, and the second section of the bottom field, B21, is written to M2. Of these MAUs, the first one to be displayed is M2, from $t_{57}$ until $t_{60}$. The decoding of the second section of Frame 2 must thus be finished at the latest at $t_{59}$, eight display lines before t60.

Since this frame is not displayed using 3:2 pull-down, the decoder waits until two MAUs become available before decoding the third section of the frame. M0 becomes available at $t_{51}$, eight display lines after it begins to be displayed between $t_{50}$ and $t_{53}$, and the next MAU to become available is M3 at $t_{55}$, eight display lines after it begins to be displayed at $t_{54}$. The third section of the top field, T22, is written to M3, and the third section of the bottom field, B22, is written to M0. Of these MAUs, the first one to be displayed is M0, from $t_{60}$ until $t_{63}$. The decoding of the third section of Frame 2 must thus be finished at the latest at $t_{62}$, eight display lines before $t_{63}$.

Sometimes the same MAU is used for both decode and display, and therefore restrictions apply to avoid overwriting MAU data before it is displayed or displaying MAU data before it is decoded. Because of these restrictions, the decoder needs to decode one-third of a frame in the display period of one field, minus the time needed to display 16 lines (see FIG. 2, the decoding of B11 between $t_{26}$ and $t_{28}$). Additionally, the decoder needs to decode one frame in the display period of one frame. There are some fields that could be decoded more slowly, but the decoder needs the computation bandwidth for the other fields. Thus, for both NTSC and PAL/SECAM, the decoder needs to decode one frame in 100% of the frame period. It can be seen that this solution not only saves memory, but also saves some decoder processing power—it can use all frame period for decoding. This is true for all R,r combinations shown in Tables 1 and 2 with the exception of R=36, r=9 or 8.

Table 4 shows MAU allocation for the 22332 frame sequence.

TABLE 4

Memory organization and decode/display schedule for R = 36, r = 6, s = 6

| Decode frame | Decode top field | Decode bottom field | Display top field | Display bottom field |
|---|---|---|---|---|
| Frame 0 | M0 = T00 | M1 = B00 | | |
| Frame 0 | M0 = T00 | M1 = B00 | | |

TABLE 4-continued

Memory organization and decode/display schedule for R = 36, r = 6, s = 6

| Decode frame | Decode top field | Decode bottom field | Display top field | Display bottom field |
|---|---|---|---|---|
| Frame 0 | M2 = T01 | M3 = B01 | | |
| Frame 0 | M2 = T01 | M3 = B01 | T00 = M0 | |
| Frame 0 | M4 = T02 | M0 = B02 | T01 = M2 | |
| Frame 0 | M4 = T02 | M0 = B02 | T02 = M4 | |
| Frame 1 | M2 = T10 | M4 = B10 | | B00 = M1 |
| Frame 1 | M2 = T10 | M4 = B10 | | B01 = M3 |
| Frame 1 | M1 = T11 | M3 = B11 | | B02 = M0 |
| Frame 1 | M1 = T11 | M3 = B11 | T10 = M2 | |
| Frame 1 | M0 = T12 | M2 = B12 | T11 = M1 | |
| Frame 1 | M0 = T12 | M2 = B12 | M12 = M0 | |
| Frame 2 | M1 = T20 | M0 = B20 | | B10 = M4 |
| Frame 2 | M1 = T20 | M0 = B20 | | B11 = M3 |
| Frame 2 | M4 = T21 | M3 = B21 | | B12 = M2 |
| Frame 2 | M4 = T21 | M3 = B21 | T20 = M1 | |
| Frame 2 | M2 = T22 | | T21 = M4 | |
| Frame 2 | M2 = T22 | | T22 = M2 | |
| Frame 2 | | | | B20 = M0 |
| Frame 2 | | M0 = B22 | | B21 = M3 |
| Frame 2 | | M0 = B22 | | B22 = M0 |
| Frame 3 | M0 = T30 | M3 = B30 | T20 = M1 | |
| Frame 3 | M0 = T30 | M3 = B30 | T21 = M4 | |
| Frame 3 | M4 = T31 | M1 = B31 | T22 = M2 | |
| Frame 3 | M4 = T31 | M1 = B31 | | B30 = M3 |
| Frame 3 | | M2 = B32 | | B31 = M1 |
| Frame 3 | | M2 = B32 | | B32 = M2 |
| Frame 3 | | | T30 = M0 | |
| Frame 3 | M0 = T32 | | T31 = M4 | |
| Frame 3 | M0 = T32 | | T32 = M0 | |
| Frame 4 | M4 = T40 | M0 = B40 | | B30 = M3 |
| Frame 4 | M4 = T40 | M0 = B40 | | B31 = M1 |
| Frame 4 | M3 = T41 | M1 = B41 | | B32 = M2 |
| Frame 4 | M3 = T41 | M1 = B41 | T40 = M4 | |
| Frame 4 | M2 = T42 | M4 = B42 | T41 = M3 | |
| Frame 4 | M2 = T42 | M4 = B42 | T42 = M2 | |
| | | | | B40 = M0 |
| | | | | B41 = M1 |
| | | | | B42 = M4 |

A particular solution for R=36, r=9 and s=3 is described with reference to FIGS. 4A and 4B and Table 5. The memory used to decode and display B-frames with 3:2 pull-down is logically divided into nine MAUs—M0 to M8, each of three rows of macroblocks. To store a whole frame, twelve MAU would be needed. The nine MAU are allocated for decode and display based on the method discussed generally above, as shown in FIGS. 4A and B. Compared to the R=36, r=9, s=9 solution, this one offers greater operational flexibility at the cost of a more complex memory controller. FIGS. 4A and 4B show a sequence of three B-pictures. Frame 1 is displayed for three fields - the top field is repeated. The two figures overlap. A portion of the display period of frame 0 is shown in both figures.

Table 5 shows a possible MAU allocation for the 22332 frame sequence.

TABLE 5

Memory organization and decode/display schedule for R = 36, r = 9, s = 3

| Decode frame | Decode top field | Decode bottom field | Display top field | Display bottom field |
|---|---|---|---|---|
| Frame 0 | M0 = T00 | M1 = B00 | | |
| Frame 0 | M0 = T00 | M1 = B00 | | |

TABLE 5-continued

Memory organization and decode/display schedule for R = 36, r = 9, s = 3

| Decode frame | Decode top field | Decode bottom field | Display top field | Display bottom field |
|---|---|---|---|---|
| Frame 0 | M2 = T01 | M3 = B01 | | |
| Frame 0 | M2 = T01 | M3 = B01 | | |
| Frame 0 | M4 = T02 | M5 = B02 | | |
| Frame 0 | M4 = T02 | M5 = B02 | | |
| Frame 0 | M6 = T03 | M7 = B03 | T00 = M0 | |
| Frame 0 | M6 = T03 | M7 = B03 | T01 = M2 | |
| Frame 0 | M8 = T04 | M0 = B04 | T02 = M4 | |
| Frame 0 | M8 = T04 | M0 = B04 | T03 = M6 | |
| Frame 0 | M2 = T05 | M4 = B05 | T04 = M8 | |
| Frame 0 | M2 = T05 | M4 = B05 | T05 = M2 | |
| Frame 1 | M6 = T10 | M8 = B10 | | B00 = M1 |
| Frame 1 | M6 = T10 | M8 = B10 | | B01 = M3 |
| Frame 1 | M2 = T11 | M1 = B11 | | B02 = M5 |
| Frame 1 | M2 = T11 | M1 = B11 | | B03 = M7 |
| Frame 1 | M3 = T12 | M5 = B12 | | B04 = M0 |
| Frame 1 | M3 = T12 | M5 = B12 | | B05 = M4 |
| Frame 1 | M7 = T13 | M0 = B13 | T10 = M6 | |
| Frame 1 | M7 = T13 | M0 = B13 | T11 = M2 | |
| Frame 1 | M4 = T14 | M6 = B14 | T12 = M3 | |
| Frame 1 | M4 = T14 | M6 = B14 | T13 = M7 | |
| Frame 1 | M2 = T15 | M3 = B15 | T14 = M4 | |
| Frame 1 | M2 = T15 | M3 = B15 | T15 = M2 | |
| Frame 2 | M7 = T20 | M4 = B20 | | B10 = M8 |
| Frame 2 | M7 = T20 | M4 = B20 | | B11 = M1 |
| Frame 2 | M2 = T21 | M8 = B21 | | B12 = M5 |
| Frame 2 | M2 = T21 | M8 = B21 | | B13 = M0 |
| Frame 2 | M1 = T22 | M5 = B22 | | B14 = M6 |
| Frame 2 | M1 = T22 | M5 = B22 | | B15 = M3 |
| Frame 2 | M0 = T23 | | T20 = M7 | |
| Frame 2 | M0 = T23 | | T21 = M2 | |
| Frame 2 | M6 = T24 | | T22 = M1 | |
| Frame 2 | M6 = T24 | | T23 = M0 | |
| Frame 2 | M3 = T25 | | T24 = M6 | |
| Frame 2 | M3 = T25 | | T25 = M3 | |
| Frame 2 | | M4 = B23 | | B20 = M4 |
| Frame 2 | | M4 = B23 | | B21 = M8 |
| Frame 2 | | M8 = B24 | | B22 = M5 |
| Frame 2 | | M8 = B24 | | B23 = M4 |
| Frame 2 | | M5 = B25 | | B24 = M8 |
| Frame 2 | | M5 = B25 | | B25 = M5 |
| Frame 3 | M8 = T30 | M4 = B30 | T20 = M7 | |
| Frame 3 | M8 = T30 | M4 = B30 | T21 = M2 | |
| Frame 3 | M7 = T31 | M5 = B31 | T22 = M1 | |
| Frame 3 | M7 = T31 | M5 = B31 | T23 = M0 | |
| Frame 3 | M1 = T32 | M2 = B32 | T24 = M6 | |
| Frame 3 | M1 = T32 | M2 = B32 | T25 = M3 | |
| Frame 3 | | M0 = B33 | | B30 = M4 |
| Frame 3 | | M0 = B33 | | B31 = M5 |
| Frame 3 | | M6 = B34 | | B32 = M2 |
| Frame 3 | | M6 = B34 | | B33 = M0 |
| Frame 3 | | M3 = B35 | | B34 = M6 |
| Frame 3 | | M3 = B35 | | B35 = M3 |
| Frame 3 | M8 = T33 | | T30 = M8 | |
| Frame 3 | M8 = T33 | | T31 = M7 | |
| Frame 3 | M7 = T34 | | T32 = M1 | |
| Frame 3 | M7 = T34 | | T33 = M8 | |
| Frame 3 | M1 = T35 | | T34 = M7 | |
| Frame 3 | M1 = T35 | | T35 = M1 | |
| Frame 4 | M8 = T40 | M7 = B40 | | B30 = M4 |
| Frame 4 | M8 = T40 | M7 = B40 | | B31 = M5 |
| Frame 4 | M1 = T41 | M4 = B41 | | B32 = M2 |
| Frame 4 | M1 = T41 | M4 = B41 | | B33 = M0 |
| Frame 4 | M5 = T42 | M2 = B42 | | B34 = M6 |
| Frame 4 | M5 = T42 | M2 = B42 | | B35 = M3 |
| Frame 4 | M0 = T43 | M6 = B43 | T40 = M8 | |
| Frame 4 | M0 = T43 | M6 = B43 | T41 = M1 | |
| Frame 4 | M0 = T44 | M8 = B44 | T42 = M5 | |
| Frame 4 | M0 = T44 | M8 = B44 | T43 = M0 | |
| Frame 4 | M0 = T45 | M5 = B45 | T44 = M3 | |
| Frame 4 | M0 = T45 | M5 = B45 | T45 = M1 | |
| | | | | B40 = M7 |
| | | | | B41 = M4 |
| | | | | B42 = M2 |
| | | | | B43 = M6 |
| | | | | B44 = M8 |
| | | | | B44 = M5 |

In the case R=30, r=5 and s=5 the memory used to decode and display the B-frames with 3:2 pull-down is logically divided into five MAU - M0 to M4, each of five rows of macroblocks. To store the whole frame, six MAU would be needed. The five MAU are allocated for decoding and display based on the method from the R=36, r=6, s=6 solution described above. The only difference is that R, r and s are scaled with 5/6.

A block diagram of a decode and display system 10 according to the present invention is shown in FIG. 5. System 10 may be MPEG-2 compliant and include a decoder 12, a memory controller 22 communicating with decoder 12, a memory 24 communicating with memory controller 22, and a display subsystem 26 communicating with memory controller 22.

Decoder 12 may be pipelined and include a parser 14, an inverse quantizer 16 communicating with parser 14, an IDCT (inverse discrete cosine transform) computation unit 18 communicating with inverse quantizer 16, and a motion compensator 20 communicating with IDCT computation unit 18.

Memory 24 may include a video, demultiplexing and packets overhead buffer 32, a first prediction picture buffer 34, a second prediction picture buffer 36, a frame buffer 38, and a buffer 40 used as a system buffer and also for system transport buffers. Frame buffer 38 is of a size less than the size necessary for storing image information for an entire frame.

The incoming video bitstream arrives at memory controller 22 as shown by signal 30 and is stored in memory 24 in video buffer 32. Memory controller 22 communicates with memory 24 as indicated by signal 52. The bitstream is then read by parser 14 as indicated by signal 42.

At the beginning of each frame, parser 14 reads the repeat_first_field and the top_field_first flags. If repeat_first_field is true, parser 14 asserts RFF (repeat_first_field) signal 44 to memory controller 22. If top_field_first is true, parser 14 asserts TFF (top_field_first) signal 46 to memory controller 22. Memory controller 22 samples signals 44 and 46 at the beginning of the storage of each frame as the frame is decoded. Due to pipeline delay in the decoder, the signals are valid when they are sampled. The pipeline delay may be a fraction of the interval in which a processed macroblock is output by decoder 12.

During decoding of B-pictures, motion compensator 20 reads forward and backward prediction information from buffers 34 and 36 through memory controller 22 as indicated by signal 48 and writes decoded frame information to frame buffer 38 through memory controller 22 as indicated by signal 50.

Memory controller 22 coordinates requests for access to memory by decoder 12 and display subsystem 26. It controls the timing as well as the memory location of memory accesses. To maintain correct timing, memory controller 22 may temporarily suspend decoder processing using enable signal 54. During normal operation, interleaved memory accesses occur to buffer 40 for system functions, to the video buffer 32 for writing and reading the bitstream, to the forward and backward prediction buffers 34 and 36 by motion compensator 20, and to frame buffer 38 for decode and display.

During the decoding of the last row of macroblocks for which image information for both fields is written to frame buffer 38 concurrently, memory controller 22 notifies parser 14 that, beginning with the next row of macroblocks, the frame will be decoded twice by asserting store bitstream location signal 56. This signal is sampled by parser 14 between rows of macroblocks. When signal 56 is asserted, parser 14 stores the location of the beginning of the slice at the beginning of the next row of macroblocks in register 28.

When the initial complete decoding of a frame with 3:2 pull-down is complete, decoder 12 is idle while waiting for begin second decoding signal 58 to be asserted. When signal 58 is asserted, decoder 12 begins decoding for a second time at the location stored in register 28.

FIG. 6 shows how decode and display system 10 must be modified in order to decode, using 3:2 pull-down, an MPEG-1 bitstream with a progressive picture rate of 24 pictures/s. The MPEG-1 bitstream does not include top_field_first and repeat_first_field flags, so TFF and RFF signals 46 and 44, respectively, are generated by a counter 62 clocked between frames by memory controller 22' using signal 60. Counter 62 is a two bit counter with the least significant bit being RFF signal 44 and the most significant bit being TFF signal 46. Memory controller 22' differs from memory controller 22 in that it generates signal 60. Parser 14' and decoder 12' differ from parser 14 and decoder 12 in that they do not generate signals 44 and 46.

Since in MPEG-1 new slices do not necessarily start at the beginning of each row of macroblocks, it is also necessary to provide a preprocessor 64 which inserts slice headers at the beginning of each row of macroblocks. Except for the above changes, decode and display system 10' is similar to the above described system 10.

FIG. 7 is a schematic block diagram illustrating the main components of memory controller 22 that are used to implement the present invention. The state of the frame buffer memory allocation is kept in a register file 72 with R/s entries, one entry for each section of a field. Half of the entries are used for the top field and the other half for the bottom field.

When the decoding of a new frame section begins, the address of the MAU that will store its image information must be determined. The macroblock row, provided by the motion compensator 20 using signal 50a, is divided by s (MAU size) by divider 106, to obtain i, the field section number (signal 88). This signal is used in conjunction with the field signal 50b provided by motion compensator 20, the TFF signal 46 and the RFF signal 44 by pointer and address determination unit 66 to compute the read pointer 86 into register file 72. The read pointer 86 is applied to the address port of register file 72 by means of multiplexer 74. Multiplexer 74 is controlled by select signal 78 provided by pointer and address determination unit 66. The content of the addressed register is then read into register 80 using data lines 108a, 108b and 108c. This content is the address of the MAU used for decoding. Register 80 is loaded in this fashion with either one or two MAU addresses depending on whether only one MAU will be written to (during decoding of the last 2r/R of a frame with 3:2 pull-down) or two MAU will be written to concurrently (such as during decoding without 3:2 pull-down or during decoding the first (R-2r)/R of a frame with 3:2 pull-down).

Register file 72 is then updated by applying write pointer 88 in combination with field signal 89 via multiplexer 74 as address 76, and writing the content of register 80 to the addressed register in register file 72. If register 80 is loaded with two MAU addresses, two writes to register file 72 are done, during which write pointer 88 has the same value but field signal 89 has different values.

During the rest of the decoding of the current field section, the appropriate MAU is addressed by applying the content of register 80 to memory 24 as address 52a via multiplexer 84. The lines 52b of memory 24 are connected to output 50 of motion compensator 20. At other times, lines 52b may be connected to other devices.

The above procedure is repeated any time a new MAU is to be accessed to store decoded image information.

The register file 72 needs to be initialized in a consistent way. That is, if the first field to be displayed is a top or bottom field, each entry except the first r/s entries of the top or bottom field should contain a distinct number in the range 0 to R/s-1. A simple method to provide such an initialization is as follows. If the first field to be displayed is a top field, consecutive top field entries are initialized with consecutive numbers from 0 to R/(2s) -1, then the consecutive bottom field entries are initialized with consecutive numbers from R/(2s) to (R-r)/s -1 and 0 to r/s-1. If the first field to be displayed is a bottom field, consecutive bottom field entries are initialized with consecutive numbers from 0 to R/(2s)-1, then the consecutive top field entries are initialized with consecutive numbers from R/(2s) to (R-r)/s -1 and 0 to r/s-1.

As shown in FIGS. 1 through 4, the picture is displayed with a field period delay relative to the decoding. For example, in FIG. 2 Frame 0 begins to be decoded at $t_1$ and begins to be displayed at $t_4$. To generate the address of the MAU to be read by the display, pointer and address determination unit 66 computes the read pointer 86 into register file 72 on the basis of signal 70 from display timing block 68. The read pointer 86 is applied to the address port of register file 72 by means of multiplexer 74. The content of the addressed register is then read into register 82 using data lines 108a, 108b and 108d. This content is the address of the MAU used for display.

During the rest of the display of the current field section, the appropriate MAU is addressed by applying the content of register 82 to memory 24 as address 52a via multiplexer 84.

The above procedure is repeated any time a new MAU is to be accessed for display.

Input 88 to pointer and address determination unit 66 indicates what field section is being decoded at any given time, but not what macroblock is being decoded at any given time. As was discussed above, store bitstream location signal 56 is sampled between rows of macroblocks and must be asserted only during the last macroblock row to be decoded in the section to be decoded before the bitstream location is to be stored. To accomplish this, signal 92 generated by unit 66 is combined with signal 90 by AND gate 96, whose output is signal 56. Signal 90 is asserted only during macroblocks that are not the last in a section being decoded that corresponds to a predetermined MAU. Signal 90 is generated as follows. Signal 50a, which designates the macroblock row being decoded, is first decremented by decrementer 104 and then divided by s by divider 102. The output 100 of divider 102 is then compared with signal 88 by comparator 94. The output of comparator 94 is signal 90.

In summary, an apparatus and method for decoding and displaying a video bitstream with 3:2 pull-down have been described. The present invention allows the use of a frame buffer whose size is not sufficient to hold an entire decoded frame. In so doing, the present invention provides memory savings, additional flexibility in decoder design, and reductions in memory controller complexity and power consumption. In the case of MPEG-2 decoders, the present invention allows the implementation of PAL/SECAM main profile at main level decoders with 3:2 pull-down using only a 16 megabit memory.

The present invention has been described in terms of a preferred embodiment. The invention, however, is not limited to the embodiment depicted and described. Rather, the scope of the invention is defined by the appended claims.

What is claimed is:

1. A method for decoding and displaying a frame to be displayed using 3:2 pull-down, comprising the steps of:

decoding said frame to obtain decoded image information and writing part of the decoded image information of said frame to a frame buffer of size less than a size sufficient to store decoded image information of the entire frame, including writing a first portion of said part of the decoded image information to a first set of memory locations of said frame buffer; and decoding a portion of said frame for a second time and writing a second portion of decoded image information to memory locations from said first set which contain image information that has been displayed at least once.

2. The method of claim 1 wherein said first set of memory locations is at most one third of said frame buffer.

3. The method of claim 1 wherein said first portion of decoded image information characterizes a first part of a first field of said frame, said first field not being the first field to be displayed, and said second portion of decoded image information characterizes a second part of said first field of said frame.

4. The method of claim 3 wherein said first part of said first field is an initial part of said first field, and said second part of said first field is a final part of said first field.

5. The method of claim 4 wherein:

a second field of said frame consists of a first part and a second part, the second part of the second field corresponding to the second part of the first field, and the first part of the first field corresponding to all or part of the first part of the second field;

concurrently with the writing of the decoded image information corresponding to the first part of the second field, image information corresponding to the part of the first field corresponding to the first part of the second field is also written;

no image information for the first field is written concurrently with image information corresponding to the second part of the second field;

image information corresponding to the second part of the second field is written immediately after image information for the first and second fields corresponding to the first part of the second field; and no image information for the second field is written concurrently with image information corresponding to the second part of the first field.

6. The method of claim 1 wherein said frame buffer is divided into a number of equal size memory allocation units, each said memory allocation unit being contiguous, said first set of memory locations consisting of a set of said memory allocation units, and the lowest multiple of the size of a memory allocation unit sufficient to hold decoded image information for an entire frame being an even multiple of the size of a memory allocation unit.

7. The method of claim 6 wherein the size of a memory allocation unit is equal to or a multiple of the size of memory necessary to hold image information corresponding to a row of macroblocks.

8. The method of claim 6 wherein said first portion of decoded image information characterizes a first part of a first field of said frame, said first field not being the first field to be displayed, and said second portion of decoded image information characterizes a second part of said first field of said frame.

9. The method of claim 8 wherein said first part of said first field is an initial part of said first field, and said second part of said first field is a final part of said first field.

10. The method of claim 9 wherein:

a second field of said frame consists of a first part and a second part, the second part of the second field corresponding to the second part of the first field, and the first part of the first field corresponding to all or part of the first part of the second field;

concurrently with the writing of the decoded image information corresponding to the first part of the second field, image information corresponding to the part of the first field corresponding to the first part of the second field is also written;

no image information for the first field is written concurrently with image information corresponding to the second part of the second field;

image information corresponding to the second part of the second field is written immediately after image information for the first and second fields corresponding to the first part of the second field; and no image information for the second field is written concurrently with image information corresponding to the second part of the first field.

11. A method for decoding and displaying a frame to be displayed using 3:2 pull-down, comprising the steps of:

decoding said frame and writing part of the decoded image information of said frame to a frame buffer of size less than a size sufficient to store decoded image information of the entire frame, including writing a first portion of decoded image information to a first set of memory locations of said frame buffer; and decoding a portion of said frame for a second time and writing a second portion of decoded image information to memory locations from said first set which contain image information that has been displayed at least once; and wherein said first set of memory locations is at most one third of said frame buffer;

said frame buffer is divided into a number of equal size memory allocation units, each said memory allocation unit being contiguous, said first set of memory locations consisting of a set of said memory allocation units, and the lowest multiple of the size of a memory allocation unit that is sufficient to hold decoded image information for an entire frame being an even multiple of the size of a memory allocation unit; and said decoding includes bidirectional prediction.

12. The method of claim 11 wherein said frame buffer consists of 3 memory allocation units and said first set of memory locations consists of one memory allocation unit.

13. The method of claim 11 wherein said frame buffer consists of 9 memory allocation units and said first set of memory locations consists of 3 memory allocation units.

14. The method of claim 11 wherein said frame buffer consists of 5 memory allocation units and said first set of memory locations consists of one memory allocation unit.

15. A method for decoding and displaying a frame to be displayed using 3:2 pull-down, comprising the steps of:

decoding said frame to obtain decoded image information and writing part of the decoded image information of said frame to a frame buffer of size less than a size sufficient to store decoded image information of the entire frame, including writing a first portion of said part of the decoded image information to a first set of memory locations of said frame buffer;

decoding a portion of said frame for a second time and writing a second portion of decoded image information to memory locations from said first set which contain image information that has been displayed at least once; and wherein:

said frame buffer is divided into a number of equal size memory allocation units, each said memory allocation unit being contiguous, said first set of memory locations consisting of a set of said memory allocation units, and the lowest multiple of the size of a memory allocation unit sufficient to hold decoded image information for an entire frame being an even multiple of the size of a memory allocation unit;

said first portion of decoded image information characterizes a first part of a first field of said frame, said first field not being the first field to be displayed, and said second portion of decoded image information characterizes a second part of said first field of said frame;

said first part of said first field is an initial part of said first field, and said second part of said first field is a final part of said first field;

a second field of said frame consists of a first part and a second part, the second part of the second field corresponding to the second part of the first field, and the first part of the first field corresponding to all or part of the first part of the second field;

concurrently with the writing of the decoded image information corresponding to the first part of the second field, image information corresponding to the part of the first field corresponding to the first part of the second field is also written;

no image information for the first field is written concurrently with image information corresponding to the second part of the second field;

image information corresponding to the second part of the second field is written immediately after image information for the first and second fields corresponding to the first part of the second field;

no image information for the second field is written concurrently with image information corresponding to the second part of the first field;

when image information for two fields is written concurrently, it is written concurrently to a succession of pairs of memory allocation units, the memory allocation units of each said pair being the two least recently displayed memory allocation units that have already begun to have their previous content displayed for the last time; and when image information for one field is written not concurrently with image information for another field, it is written to a succession of memory allocation units, each memory allocation unit being the least recently displayed memory allocation unit that has already begun to have its previous content displayed for the last time.

16. The method of claim 15 wherein the memory allocation units to be written to are determined from information on what memory allocation unit was used to hold any section of a field in the frame currently decoded and any section, corresponding to a section in the frame currently decoded that has not yet been decoded, in the immediately previous frame to be decoded, without comparing display times of any two memory allocation units.

17. A system for decoding and display of a bitstream representing compressed video, comprising:

a decoder;

a memory manager responsive to a top field first signal and to a repeat first field signal, said memory manager being connected to said decoder;

a display subsystem connected to said memory manager; and a memory connected to said memory manager, said memory including a frame buffer of size less than a size sufficient to store decoded image information for an entire frame.

18. The system of claim 17 wherein the size of said frame buffer is at least three fourths of a size sufficient to store decoded image information for an entire frame.

19. The system of claim 17 wherein said top field first signal is generated by said decoder and said repeat first field signal is generated by said decoder.

20. The system of claim 17 wherein said top field first signal is generated by a counter clocked by said memory manager and said repeat first field signal is generated by said counter.

21. The system of claim 20 further including a preprocessor connected to said memory manager for inserting slice headers at beginnings of rows of macroblocks in said bitstream.

22. A system for decoding and displaying a bitstream representing compressed video, comprising:

a decoder;

a memory manager responsive to a top field first signal and to a repeat first field signal, said memory manager being connected to said decoder;

a display subsystem connected to said memory manager;

a memory connected to said memory manager, said memory including a frame buffer of a size less than a size sufficient to store decoded image information for an entire frame; and wherein said memory manager includes a register file having a data port and an address port, a decode memory allocation unit address register connected to the data port of said register file and to an address port of said memory, and a display memory allocation unit address register connected to the data port of said register file and to the address port of said memory.

23. The system of claim 22 wherein said frame buffer consists of a plurality of memory allocation units and said register file has a number of addresses equal to a number of memory allocation units necessary to store an entire frame.

24. A system for decoding and displaying a bitstream representing compressed video, comprising:

a decoder;

a memory manager responsive to a top field first signal and to a repeat first field signal, said memory manager being connected to said decoder;

a display subsystem connected to said memory manager;

a memory connected to said memory manager, said memory including a frame buffer of size less than a size sufficient to store decoded image information for an entire frame; and wherein:

said decoder includes a register for storing a location within said bitstream of a beginning of a portion of a frame that is to be decoded twice;

said decoder is responsive to a store bitstream location signal generated by said memory manager; and said decoder is responsive to a begin second decoding signal generated by said memory manager.

* * * * *